United States Patent
Hong et al.

(10) Patent No.: US 10,838,658 B2
(45) Date of Patent: Nov. 17, 2020

(54) MEMORY CONTROLLER AND METHOD OF OPERATING THE SAME

(71) Applicant: SK hynix Inc., Gyeonggi-do (KR)

(72) Inventors: Sung Kwan Hong, Seoul (KR); Ik Sung Oh, Gyeonggi-do (KR); Ji Hoon Yim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/114,603

(22) Filed: Aug. 28, 2018

(65) Prior Publication Data
US 2019/0227745 A1  Jul. 25, 2019

(30) Foreign Application Priority Data
Jan. 25, 2018 (KR) .................. 10-2018-0009531

(51) Int. Cl.
| | | |
|---|---|---|
| *G06F 13/00* | (2006.01) | |
| *G06F 3/06* | (2006.01) | |
| *G06F 13/18* | (2006.01) | |
| *G06F 13/16* | (2006.01) | |
| *G06F 12/02* | (2006.01) | |

(52) U.S. Cl.
CPC ............ *G06F 3/0659* (2013.01); *G06F 3/061* (2013.01); *G06F 3/0679* (2013.01); *G06F 12/0246* (2013.01); *G06F 13/1642* (2013.01); *G06F 13/1673* (2013.01); *G06F 13/18* (2013.01); *G06F 2212/7209* (2013.01)

(58) Field of Classification Search
CPC ........ G06F 13/00; G06F 3/061; G06F 3/0679; G06F 12/246; G06F 13/1673; G06F 3/0659; G06F 12/0246; G06F 13/1642; G06F 13/18; G06F 2212/7209
USPC ..................... 710/30–40, 305–306
See application file for complete search history.

(56) References Cited

U.S. PATENT DOCUMENTS

| | | | | |
|---|---|---|---|---|
| 10,241,828 B2* | 3/2019 | Yang | ........................ | G06F 9/466 |
| 2006/0004946 A1* | 1/2006 | Shah | ........................ | G06F 13/28 |
| | | | | 711/100 |
| 2007/0088967 A1* | 4/2007 | Fu | ........................ | G06F 1/266 |
| | | | | 713/340 |
| 2009/0147017 A1* | 6/2009 | Jiao | ........................ | G06T 15/005 |
| | | | | 345/582 |
| 2009/0150891 A1* | 6/2009 | Matsa | ........................ | G06F 9/4881 |
| | | | | 718/103 |
| 2010/0049913 A1* | 2/2010 | Marcu | ........................ | G06F 3/0611 |
| | | | | 711/114 |

(Continued)

FOREIGN PATENT DOCUMENTS

| | | |
|---|---|---|
| KR | 1020060013829 | 2/2006 |
| KR | 1020100042885 | 4/2010 |

*Primary Examiner* — Tim T Vo
*Assistant Examiner* — Kim T Huynh
(74) *Attorney, Agent, or Firm* — IP & T Group LLP

(57) ABSTRACT

Provided herein may be a memory controller and a method of operating the memory controller. The memory controller may include: a host interface layer configured to receive a request for a memory device from a host; a flash translation layer configured to generate a descriptor including a flag indicating whether the request is a priority read request; and a flash interface layer configured to suspend requests input prior to the priority read request depending on the flag, store the requests input prior to the priority read request, and perform the priority read request.

14 Claims, 12 Drawing Sheets

(56) References Cited

U.S. PATENT DOCUMENTS

| | | | |
|---|---|---|---|
| 2010/0100666 A1* | 4/2010 | Min | G06F 13/1668 |
| | | | 711/103 |
| 2010/0161851 A1* | 6/2010 | Grishaw | G06F 13/128 |
| | | | 710/30 |
| 2012/0089812 A1* | 4/2012 | Smith | G06F 9/4843 |
| | | | 712/21 |

* cited by examiner

US 10,838,658 B2

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2018-0009531, filed on Jan. 25, 2018, which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

Generally, a storage device is a device which stores data under control of a host device such as a computer, a smartphone, or a smartpad. According to the type of device provided to store data, examples of the storage device may be classified into a device such as a hard disk drive (HDD) which stores data in a magnetic disk, and a device such as a solid state drive (SSD) or a memory card which stores data in a semiconductor memory, particularly, a nonvolatile memory.

The storage device may include a memory device in which data is stored, and a memory controller configured to store data in the memory device. The memory device may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

SUMMARY

Various embodiments of the present disclosure are directed to a memory controller configured to suspend, so as to perform a priority read command, an on-going operation for a normal command, and a method of operating the memory controller.

An embodiment of the present disclosure may provide for a memory controller including: a host interface layer configured to receive a request for a memory device from a host; a flash translation layer configured to generate a descriptor including a flag indicating whether the request is a priority read request; and a flash interface layer configured to suspend requests input prior to the priority read request depending on the flag, store the requests input prior to the priority read request, and perform the priority read request.

An embodiment of the present disclosure may provide for a memory system comprising: a memory device and a command scheduler suitable for generating, in response to a request, a priority descriptor and a normal descriptor; a memory operation control unit suitable for: suspending, in response to the priority descriptor queued in a first queue, an on-going operation or holding a pending operation for the normal descriptor queued prior to the priority descriptor in the first queue; and moving the normal descriptor queued prior to the priority descriptor from the first queue into a second queue; and a resume processor suitable for controlling, after completion of an operation corresponding to the priority descriptor, the memory device to resume the suspended or held operation according to the normal descriptor in the second queue.

DETAILED DESCRIPTION

Figure 1:
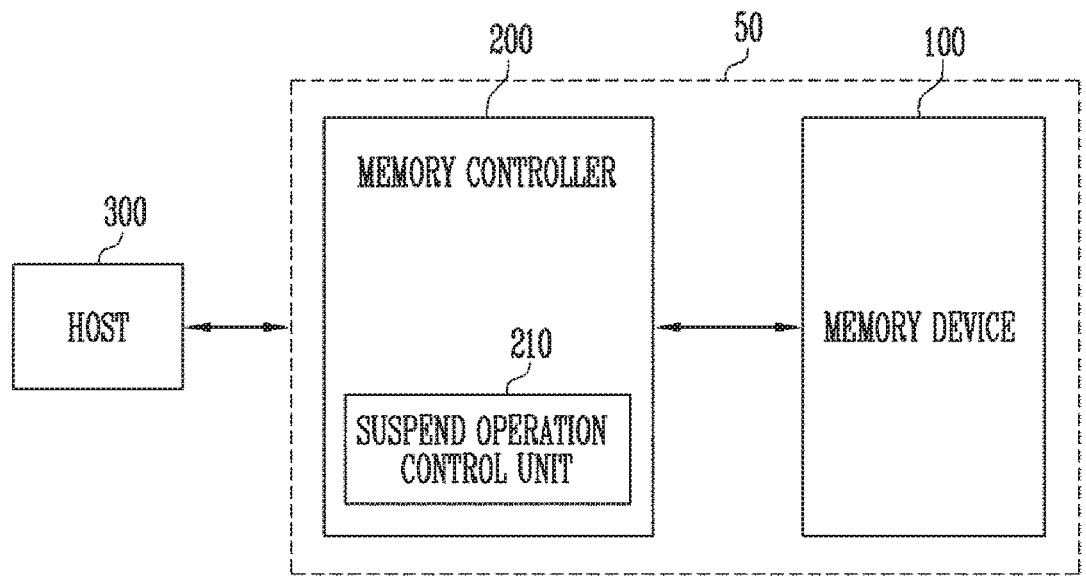
FIG. 1 is a diagram illustrating a storage device including a memory controller in accordance with an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Hereinafter, embodiments will be described with reference to the accompanying drawings. Embodiments are described herein with reference to cross-sectional illustrations that are schematic illustrations of embodiments and intermediate structures. As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a storage device 50 including a memory controller 200 in accordance with an embodiment of the present disclosure.

Referring to FIG. 1, the storage device 50 may include a memory device 100, and the memory controller 200.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. The memory device 100 may store data to a memory block in a sequential or random order under control of the memory controller 200. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change memory (PRAM), magnetoresistive random access memory (MRAM), a ferroelectric random (STT-RAM).

In an embodiment, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

The memory device 100 may be configured to receive a command and an address from the memory controller 200 and access a region of the memory cell array which is selected by the address. In other words, the memory device 100 may perform an operation corresponding to the command on the region selected by the address. For example, the memory device 100 may perform a write (program) operation, a read operation, and an erase operation. During a program operation, the memory device 100 may program data to the region selected by the address. During a read operation, the memory device 100 may read data from the region selected by the address. During an erase operation, the memory device 100 may erase data from the region selected by the address.

In an embodiment, the memory device 100 may suspend, in response to an input suspend command, an operation that is currently performed. The operation to be suspended may correspond to any one of a program operation, a read operation, and an erase operation. The memory device 100 may store, in a separate buffer memory or cache memory, suspend-related information that is information about the degree to which the suspended operation has been performed before the suspension. In an embodiment, the memory device 100 may include a separate register configured to manage the suspend-related information. In various embodiments, the suspend-related information may include information indicating the degree to which the corresponding suspended operation has been performed before the suspension. The memory device 100 may resume the suspended operation in response to an input resume command. In an embodiment, the memory device 100 may perform the suspended operation in succession to the suspended status with reference to the suspend-related information, rather than re-performing the corresponding operation from the beginning.

The memory controller 200 may control the operation of the memory device 100 in response to a request of a host 300 or regardless of the request of the host 300.

For example, the memory controller 200 may control the memory device 100 to perform a program operation, a read operation, or an erase operation in response to a request from the host 300. During the program operation, the memory controller 200 may provide a program command, a physical address, and data to the memory device 100. During the read operation, the memory controller 200 may provide a read command and a physical address to the memory device 100. During the erase operation, the memory controller 200 may provide an erase command and a physical address to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 to perform background operations such as a program operation for wear leveling, or a program operation for garbage collection.

The memory controller 200 may execute firmware for controlling the memory device 100. In the case where the memory device 100 is a flash memory device, the memory controller 200 may manage firmware such as a flash translation layer (FTL) for controlling communication between the host 300 and the memory device 100. In detail, the memory controller 200 may translate a logical address included in a request from the host 300 to a physical address.

In an embodiment, some read requests among read requests transmitted from the host 300 may be read requests of which read latencies are significant. A read request of which the read latency is significant may be a read request in which the output of read data must be ensured within a preset latency. In this specification, the read request of which the read latency is significant is referred to as "priority read request", a read command for the priority read request is referred to as "priority read command" and a read operation responding to the priority read command is referred to as "priority read operation".

In an embodiment of the present disclosure, the memory controller 200 may include a suspend operation control unit 210. The suspend operation control unit 210 may periodically monitor a suspend queue included in the memory controller 200. An on-going normal command may be suspended to preferentially perform the priority read command, and may be queued in the suspend queue, by a flash memory controller 203 that will be described later. The suspend operation control unit 210 may monitor the suspend queue. The suspend operation control unit 210 may generate, if commands are queued in the suspend queue, a resume command for resuming operations corresponding to the suspended commands based on an operating status of the memory device 100, and may provide the resume command to the memory device 100.

The operation of the suspend operation control unit 210 in accordance with an embodiment of the present disclosure will be described in detail later herein with reference to FIGS. 2 to 6.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
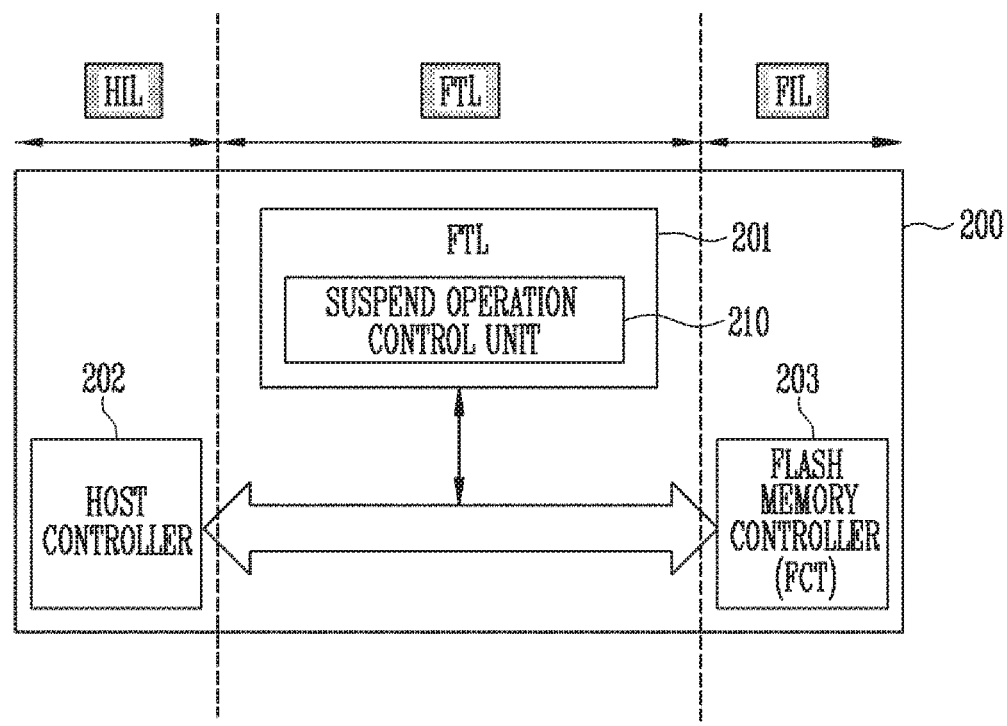
FIG. 2 is a diagram illustrating functionally-divided components of the memory controller of FIG. 1 in accordance with an embodiment of the present disclosure.

FIG. 2 is a diagram illustrating functionally-divided components of the memory controller 200 of FIG. 1 in accordance with an embodiment of the present disclosure.

Referring to FIG. 2, the memory controller 200 may include a flash translation layer (FTL) 201, a host controller 202, and a flash memory controller 203. In FIG. 2, the case where the memory controller 200 controls a flash memory device is illustrated by way of example. In other words, the memory device 100 described with reference to FIG. 1 may be a flash memory device.

The memory controller 200 may be divided into three layers. In detail, the memory controller 200 may be divided into a host interface layer (hereinafter, referred to as "HIL") for managing an interface with the host, a flash interface layer (hereinafter, referred to as "FIL") for managing an interface with the flash memory device, and a flash translation layer (hereinafter, referred to as "FTL") for managing translation between the two layers.

The memory controller 200 may execute firmware (hereinafter, referred to as "FW") for controlling the operation of the memory device. In an embodiment, the FW to be executed by the memory device may be divided into FWs which respectively correspond to the HIL, the FTL, and the FIL. The term "HIL", "FTL", or "FIL" may also be used as a term indicating the corresponding FW.

The HIL may be embodied using the host controller 202. The host controller 202 may communicate with the host. In an embodiment, the host controller 202 may communicate with the host using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multiMedia card (MMC), embedded MMC (eMMC), dual in-line memory module (DIMM), registered DIMM (RDIMM), and load reduced DIMM (LRDIMM) communication methods. The host controller 202 may provide, to the FTL 201, requests received from the host. The host controller 202 may provide, to the host, results of performing the requests received from the host. In an embodiment, the host controller 202 may be implemented as hardware.

The FTL 201 may be firmware configured to perform overall operations for controlling communication between the host and the flash memory device.

In an embodiment, the FTL 201 may translate a logical address included in a request from the host into a physical address. In an embodiment, the physical address may be an address indicating a specific memory region included in the flash memory device.

In an embodiment, the FTL 201 may control operations for wear-leveling. For example, the FTL 201 may manage wear-levels of memory blocks included in flash memory devices. Memory cells of the flash memory devices may be aged by program operations and erase operations on the memory blocks. An aged memory cell, i.e., a worn memory cell, may cause a defect (e.g., a physical defect). Therefore, the FTL 201 may manage the memory blocks such that respective erase-write cycle counts of the blocks are equalized so as to prevent a specific memory block of the flash memory devices from being worn earlier than the other memory blocks are.

In an embodiment, the FTL 201 may control operations for garbage collection. The garbage collection may be a background operation of collecting valid data included in each of a plurality of memory blocks into a memory block having the same address so as to secure usable free blocks.

The FIL may be embodied using the flash memory controller 203. The flash memory controller 203 may communicate with a flash memory device 100. In an embodiment, the flash memory controller 203 may communicate with the flash memory device 100 through any one communication interface of a NAND flash or a NOR flash. The flash memory controller 203 may provide, to the flash memory device 100, commands corresponding to requests received from the FTL 201. The flash memory controller 203 may receive results of operations performed by the flash memory device 100 in response to the commands. The flash memory controller 203 may be implemented as hardware.

In an embodiment, the FTL 201 may provide descriptors corresponding to respective operations to be performed by the flash memory controller 203. Each descriptor may include information related to a corresponding request input from the host 300. For example, the descriptor may include a result of translation of a logical address included in the request from the host 300 into a physical address. The flash memory controller 203 may perform an operation on the flash memory device 100 based on the descriptor. For example, the flash memory controller 203 may provide a command, an address, or data to the flash memory device 100 based on the descriptor.

In an embodiment of the present disclosure, some read requests among read requests input from the host may be read requests of which read latencies are significant. A read request of which the read latency is significant may be a read request in which the output of read data must be ensured within a preset latency. In this specification, the read request of which the read latency is significant may be referred to as "priority read request". Furthermore, a read command for performing the priority read request may be referred to as "priority read command".

In the case of a conventional memory controller, the FTL 201 controls operations to be performed by the flash memory device 100 while the FIL manages only communication with the flash memory device 100. Hence, the degree of complexity in design of the FTL 201 and the overhead of the FTL 201 are increased. For instance, in the conventional case, when a priority read request is received from the host controller 202, the FTL 201 controls the flash memory controller 203 to suspend an operation which is in progress, transmit a priority read command corresponding to the priority read request to the flash memory device 100, and then resume, after the operation of performing the priority read command has been completed, the operation that has been suspended.

In an embodiment of the present disclosure, when a priority read request is input from the host, the FTL 201 may set a flag to the corresponding read request and provide it to the flash memory controller 203. In other words, the FTL 201 may set a flag to the descriptor depending on whether the input request is a priority read request, and then provide it to the flash memory controller 203. The FTL 201 may not be involved in a suspend operation for performing the priority read request. In other words, the FTL 201 may perform only the operation of setting a flag to the descriptor depending on whether the input request is a priority read request, and providing it to the flash memory controller 203, but may not determine which operation is to be suspended and which operation is to be performed.

The flash memory controller 203 may determine whether the corresponding read request is a priority read request depending on a setting status of the flag. The flag may be 1-bit data having a value of 0 or 1. When the flag has a value of 0, the flash memory controller 203 may recognize that the flag has been set, and, when the flag has a value of 1, the flash memory controller 203 may recognize that the flag has not been set. On the contrary, when the flag has a value of 1, the flash memory controller 203 may recognize that the flag has been set, and, when the flag has a value of 0, the flash memory controller 203 may recognize that the flag has not been set.

The flash memory controller 203 may determine commands to be suspended, depending on the setting status of the flag included in the descriptor. Alternatively, the flash memory controller 203 may determine commands to be held, depending on the setting status of the flag included in the descriptor. If a descriptor corresponding to a priority read request is input, the flash memory controller 203 may suspend a command that is currently performed, hold commands that are prior to the priority read request according to a command sequence, and first perform the priority read command corresponding to the priority read request. The flash memory controller 203 may queue the suspended or held commands in the suspend queue.

The FTL 201 may further include the suspend operation control unit 210. The suspend operation control unit 210 may periodically monitor the suspend queue included in the memory controller 200. The suspend queue may store a command suspended to preferentially perform the priority read command. An on-going normal command may be suspended to preferentially perform the priority read command, and may be queued in the suspend queue, by the flash memory controller 203. The suspend operation control unit 210 may monitor the suspend queue. The suspend operation control unit 210 may generate, if commands are queued in the suspend queue, a resume command for resuming operations corresponding to the suspended commands based on an operating status of the flash memory device 100, and may provide the resume command to the flash memory device 100.

Therefore, in accordance with an embodiment of the present disclosure, the FTL 201 may not be directly involved in a suspend operation. The suspend operation control unit 210 of the FTL 201 may periodically monitor the suspend queue included in the flash memory controller 203, and may provide a resume command to the flash memory device. Consequently, the degree of complexity in design of the FTL 201 may be reduced.

Figures 3, 4:
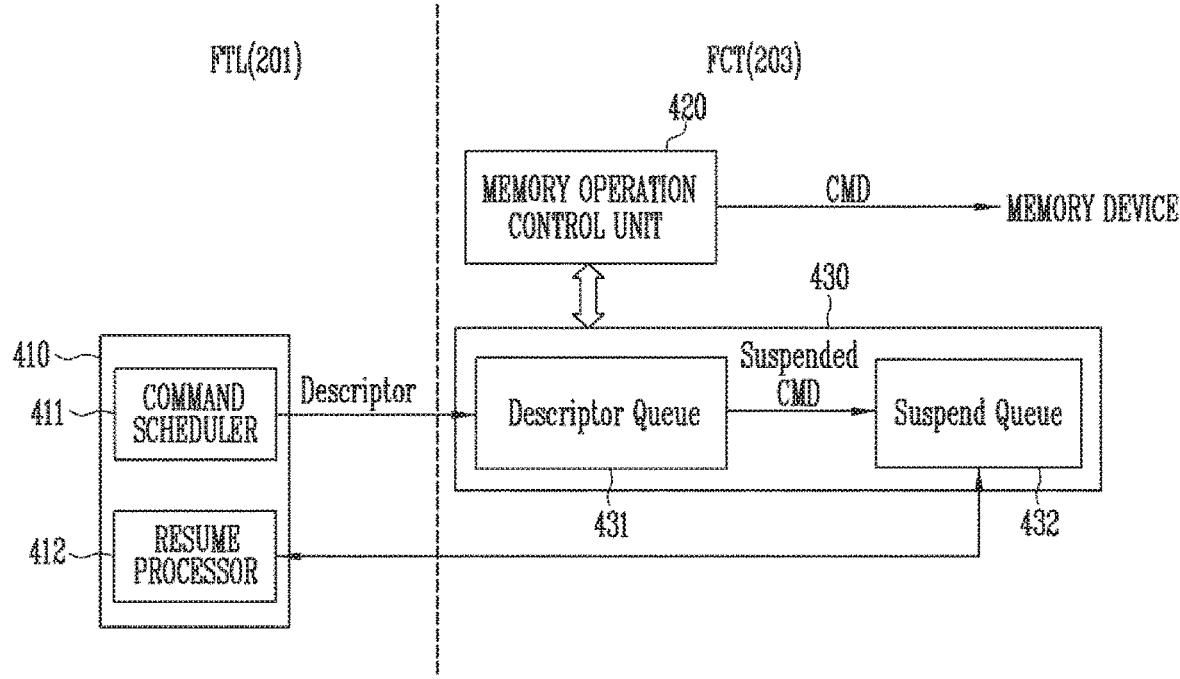
FIG. 3 is a block diagram illustrating components of a suspend operation control unit and a flash memory controller of FIG. 2 in accordance with an embodiment of the present disclosure.
FIG. 4 is a diagram illustrating a descriptor queue of FIG. 3 in accordance with an embodiment of the present disclosure.

FIG. 3 is a block diagram illustrating components of the suspend operation control unit 210 and the flash memory controller 203 of FIG. 2 in accordance with an embodiment of the present disclosure.

Referring to FIG. 3, the FTL 201 may include a suspend operation control unit 410. The suspend operation control unit 410 may be the suspend operation control unit 210 described with reference to FIGS. 1 and 2. The suspend operation control unit 410 may include a command scheduler 411 and a resume processor 412. In an embodiment, the command scheduler 411 may not be included in the suspend operation control unit 410. For example, the FTL 201 may generate a descriptor in response to a request input from the host 300 regardless of the suspend operation control unit 410. The suspend operation control unit 410 may be implemented by using a logic circuits or a processor.

The command scheduler 411 may generate a descriptor for requests input from the host. For example, the command scheduler 411 may translate a logical address included in a request input from the host into a physical address indicating a specific region of memory cells included in the flash memory device 100, and may generate a descriptor including the translated physical address.

In an embodiment, the command scheduler 411 may determine whether a read request input from the host 300 is a read request of which the read latency is significant. The read request of which the read latency is significant may be a priority read request in which the output of read data must be ensured within a preset latency.

If a priority read request is input, the command scheduler 411 may generate a descriptor including a flag indicating that the corresponding request is a priority read request. For example, the command scheduler 411 may generate a descriptor including a flag having a value of 0 or 1 depending on whether the read request input from the host is a priority read request. For example, when the flag has a value of 0, the flag may have been set, and, when the flag has a value of 1, the flag may not have been set. Alternatively, on the contrary, when the flag has a value of 1, the flag may have been set, and, when the flag has a value of 1, the flag may not have been set. Therefore, when the read request input from the host 300 is a priority read request, the command scheduler 411 may set the flag. With regard to requests other than the priority read request, the command scheduler 411 may not set the flag.

The command scheduler 411 may input the generated descriptor to a descriptor queue 431 included in a command management unit 430 of the flash memory controller 203. In various embodiments, the command scheduler 411 may generate a descriptor queue 431 to which descriptors have been input in a requested sequence, and may provide the generated descriptor queue 431 to the command management unit 430.

The resume processor 412 may access a suspend queue 432 included in the command management unit 430. For example, the resume processor 412 may monitor the suspend queue 432 at each predetermined cycle. Alternatively, the resume processor 412 may periodically check the suspend queue 432. If a suspended command is present in the suspend queue 432, the resume processor 412 may generate a resume command depending on whether the memory device 100 is operating, and may provide the generated resume command to the memory device 100.

The flash memory controller 203 may include a memory operation control unit 420 and the command management unit 430. The command management unit 430 may include the descriptor queue 431 and the suspend queue 432.

The memory operation control unit 420 may control the memory device 100. The memory operation control unit 420 may provide, to the memory device 100, a command CMD to be performed by the memory device 100 based on the descriptor queue 431 included in the command management unit 430. For example, the memory operation control unit 420 may generate a command based on the descriptor stored in the descriptor queue 431, and provide the generated command to the memory device 100. The memory operation control unit 420 may be implemented by using a logic circuit or a processor.

In an embodiment, the memory operation control unit 420 may determine whether requests having flags which have been set, are present among requests included in the descriptor queue 431. For example, the memory operation control unit 420 may search for a descriptor having a flag which has been set among descriptors stored in the descriptor queue 431. If there is no descriptor having a flag which has been set among the descriptors stored in the descriptor queue 431, the requests may be performed in a sequence in which they have been input to the descriptor queue 431 because there is no priority read request.

In the case where a descriptor has a flag which has been set, is present among the descriptors stored in the descriptor queue 431, the memory operation control unit 420 may determine commands to be suspended among the descriptors stored in the descriptor queue 431. Alternatively, in the case where there is a descriptor having a flag which is has been set, the memory operation control unit 420 may determine commands to be held among the descriptors stored in the descriptor queue 431.

The descriptor having a flag which has been set indicates that the corresponding request is a priority read request. Therefore, the memory operation control unit 420 may provide a suspend command to the memory device 100 so as to suspend an operation that is currently performed. Furthermore, the memory operation control unit 420 may hold requests input prior to the priority read request among the requests input to the descriptor queue 431. The memory operation control unit 420 may store the suspended commands and the held commands including corresponding descriptors respectively in the suspend queue 432.

As described above, in order to perform a priority read operation, the memory controller 200 may suspend an operation which is currently performed, and then preferentially perform the priority read operation. The memory controller 200 may perform an operation of resuming the suspended operation after the priority read operation has been performed. In this case, the FTL 201 may perform only an operation of setting a flag indicating that the input request is a priority read request by which the priority read operation must be preferentially performed, and providing the set flag to the flash memory controller 203, but may not be directly involved in the suspend (hold) operation. Based on the set flag, the flash memory controller 203 may suspend the operation that is currently performed, and input the suspended command to the suspend queue 432. Although the FTL 201 is not involved in the suspend operation, the FTL 201 may periodically check the suspend queue 432 so as to minimize delay of the operation, generate a resume command based on the operating status of the memory device 100 with regard to the command input to the suspend queue, and provide the resume command to the memory device 100. Thereby, the degree of complexity in design of the FTL 201 may be reduced.

FIG. 4 is a diagram illustrating the descriptor queue 431 of FIG. 3 in accordance with an embodiment of the present disclosure.

Referring to FIG. 4, the descriptor queue 431 may store descriptors generated by the FTL 201. For example, the descriptors may correspond to respective requests of the host 300. Each descriptor may include a request number Request # indicating an input order of the corresponding request, an operation type of the corresponding request, and a physical address ADDR of the memory device 100 to be accessed and a flag FLAG. In an embodiment of the present disclosure, the flag FLAG may indicate whether the corresponding request is a priority read request. For example, if the flag FLAG is in a set status, the corresponding request may be a priority read request. If the flag FLAG is in an off status, the corresponding request is a normal request rather than being a priority read request.

Among requests input to the descriptor queue 431 of FIG. 4, request number 0 may correspond to a write request for ADDR0, request number 1 may correspond to a read request for ADDR1, request number 2 may correspond to a write request for ADDR2, request number 3 may correspond to a read request for ADDR3, and request number 4 may correspond to a priority read request for ADDR4.

Request number 5 may correspond to a write request for ADDR0, request number 6 may correspond to a read request for ADDR1, request number 7 may correspond to a write request for ADDR2, request number 8 may correspond to a read request for ADDR3, and request number 9 may correspond to a read request for ADDR4.

In FIG. 4, because the flag of request number 4 is in a set status ("ON"), it may be understood that request number 4 is a priority read request. It may be understood that the other requests are normal requests because the flags thereof each have an off status ("OFF").

Consequently, the requests of request numbers 0 to 4 may be suspended or held so as to perform the priority read operation corresponding to request number 4 prior to the requests of request numbers 0 to 4.

Figure 5:
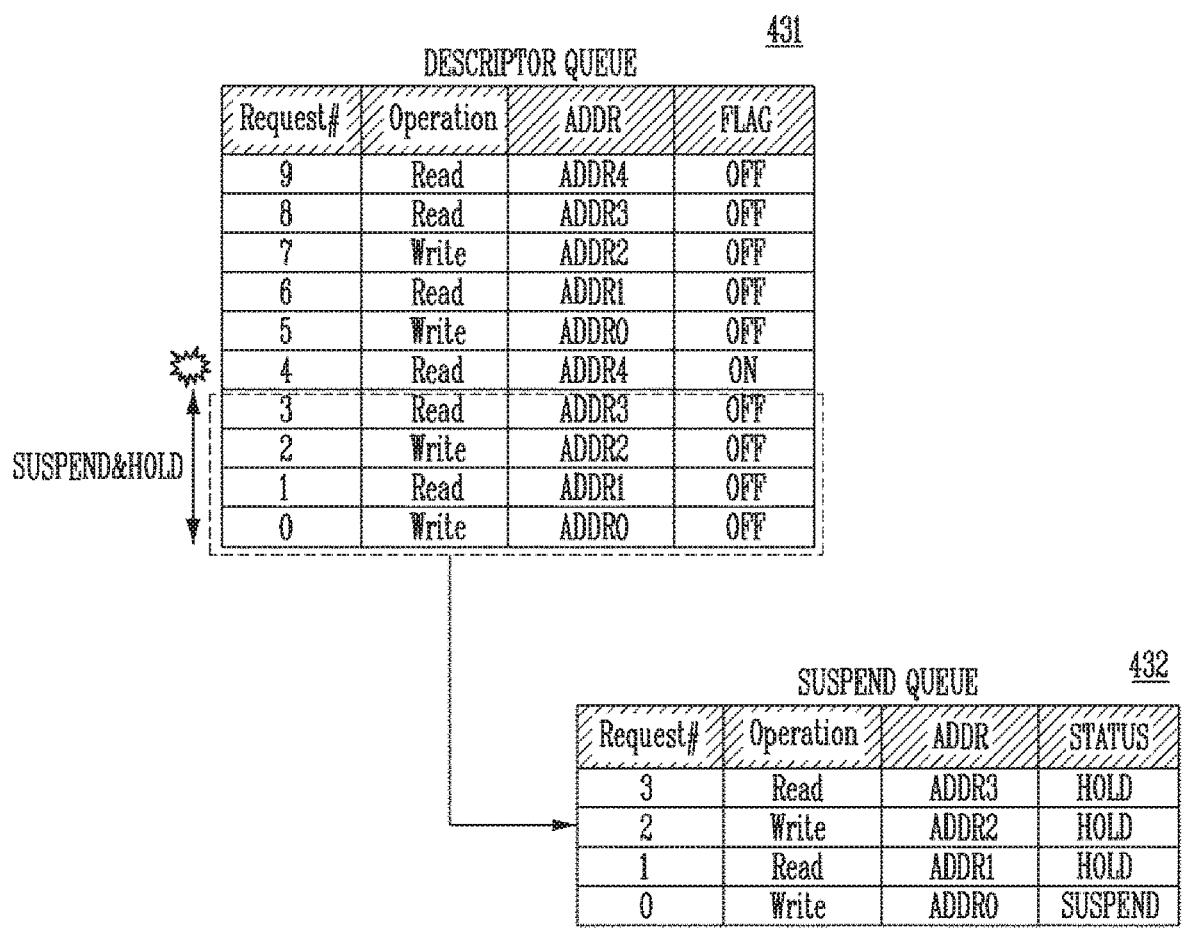
FIG. 5 is a diagram illustrating an operation of a command management unit described with reference to FIG. 3 in accordance with an embodiment of the present disclosure.

FIG. 5 is a diagram illustrating the operation of the command management unit 430 described with reference to FIG. 3.

The memory device 100 may sequentially perform operations in response to the requests input to the descriptor queue 431. In FIG. 5, the operation of request number 0 is being performed.

In FIG. 5, the descriptor queue 431 is identical with the descriptor queue 431 of FIG. 4. According to the descriptors corresponding to the requests input to the descriptor queue 431, it may be understood that request number 4 is a priority read request because the flag of request number 4 is in a set status ("ON"). Therefore, the command management unit 430 may suspend the write operation that is currently performed by the memory device 100, and may hold the operations corresponding to request numbers 1 to 3.

Here, the memory operation control unit 420 may dequeue request numbers 0 to 3 of the descriptor queue 431, and input (queue) the corresponding requests to the suspend queue 432. In an embodiment, when inputting commands to the suspend queue, the memory operation control unit 420 may also store the suspend or hold statuses of the corresponding commands to the suspend queue.

Figure 6:
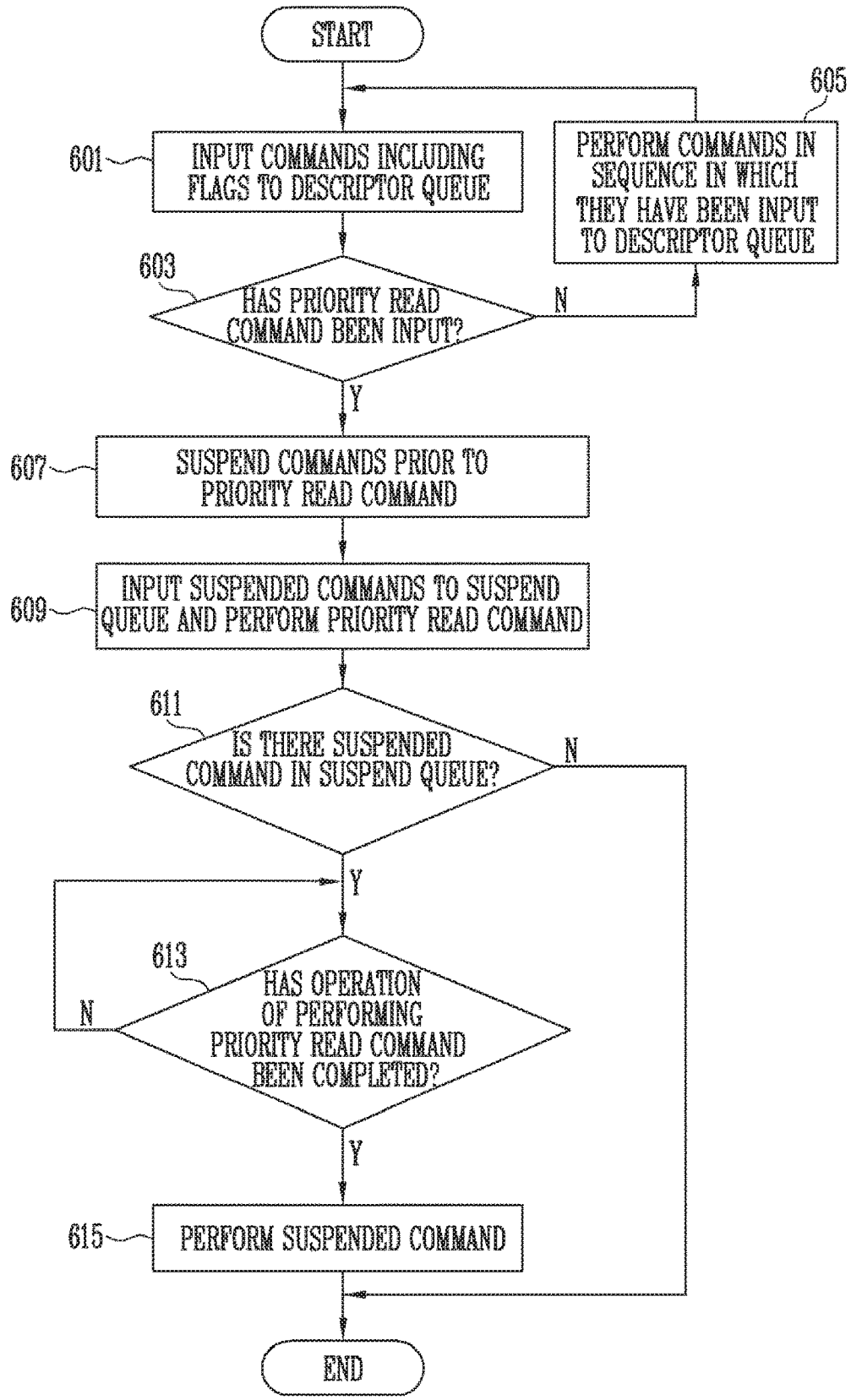
FIG. 6 is a flowchart illustrating an operation of the memory controller in accordance with an embodiment of the present disclosure.

FIG. 6 is a flowchart illustrating the operation of the memory controller 200 in accordance with an embodiment of the present disclosure.

Referring to FIG. 6, at step 601, the memory controller 200 may input commands including flags to the descriptor queue 431.

In detail, the memory controller 200 may generate descriptors for requests received from the host 300, and store the generated descriptors to the descriptor queue 431. Each descriptor may include information related to the corresponding request input from the host 300. For example, the descriptor may include a result of translation of a logical address included in the request from the host 300 into a physical address. The memory controller 200 may perform an operation on the memory device 100 based on the descriptor. In an embodiment, when a request input from the host 300 corresponds to a priority read request, the memory controller 200 may generate a descriptor including a flag of a set status. On the contrary, when a request input from the host is not a priority read request, the memory controller may generate a descriptor including a flag of an OFF status.

At step 603, the memory controller 200 may determine whether a priority read command has been input using the flags of the descriptors included in the descriptor queue 431. If there is a descriptor including a flag of a set status, the memory controller 200 may determine that the priority read command has been input. On the other hand, if there is no descriptor including a flag of a set status, the memory controller 200 may determine that the priority read command has not been input. As a result of the determination, if the priority read command has been input, the process proceeds step 607, and, if not, the process proceeds step 605.

At step 605, the memory controller 200 may perform the commands in a sequence in which they have been input to the descriptor queue 431.

At step 607, the memory controller 200 may suspend commands preceding to the priority read command. For example, the memory controller 200 may suspend the commands for the requests input prior to the descriptor corresponding to the priority read request. In detail, the command that is currently being performed may be suspended. The commands for the requests that are input prior to the priority read request although not being currently performed may be held.

At step 609, the memory controller 200 may input the suspended (or held) commands to the suspend queue. After having performed the input operation, the memory controller 200 may perform the priority read command.

At step 611, the memory controller 200 may determine whether a suspended command is present in the suspend queue. If a suspended command is present in the suspend queue, the process proceeds step 613.

At step 613, the memory controller 200 may determine whether the operation in response to the priority read command performed at step 609 has been completed.

At step 615, the memory controller 200 may resume the suspended commands input to the suspend queue.

Figure 7:
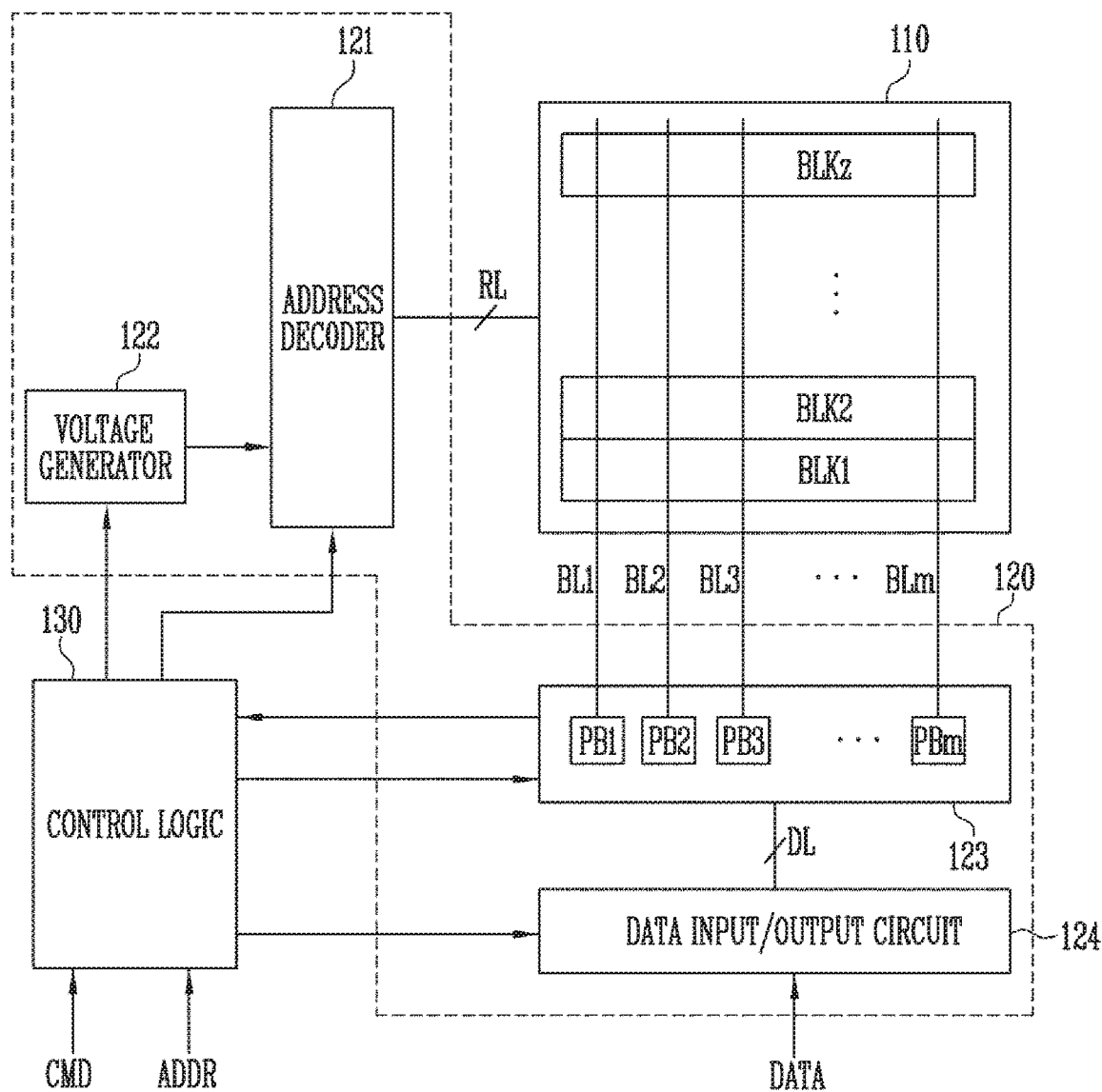
FIG. 7 is a diagram illustrating a configuration of the memory device of FIG. 1 in accordance with an embodiment of the present disclosure.

FIG. 7 is a diagram illustrating the configuration of the memory device 100 of FIG. 1.

Referring to FIG. 7, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz are coupled to the address decoder 121 through row lines RL. The memory blocks BLK1 to BLKz may be coupled to the read/write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line among the plurality of memory cells are defined as one page. In other words, the memory cell array 110 is formed of a plurality of pages. In an embodiment, each of the memory blocks BLK1 to BLKz included in the memory cell array 110 may include a plurality of dummy cells. Here, one or more dummy cells may be coupled in series between a drain select transistor and memory cells, and between a source select transistor and the memory cells.

Each of the memory cells of the memory device 100 may be formed of a single level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, a read/write circuit 123, and a data input/output circuit 124.

The peripheral circuit 120 may drive the memory cell array 110. For example, the peripheral circuit 120 may drive the memory cell array 110 to perform a program operation, a read operation, or an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under control of the control logic 130. The address decoder 121 may receive addresses ADDR from the control logic 130.

The address decoder 121 may decode a block address among the received addresses ADDR. The address decoder 121 selects at least one of the memory blocks BLK1 to BLKz according to the decoded block address. The address decoder 121 may decode a row address among the received addresses ADDR. The address decoder 121 may select at least one word line WL of the selected memory block by applying voltages supplied from the voltage generator 122 to the at least one word line WL according to the decoded row address.

During a program operation, the address decoder 121 may apply a program voltage to a selected word line and apply a pass voltage having a level lower than that of the program voltage to unselected word lines. During a program verify operation, the address decoder 121 may apply a verify voltage to a selected word line and apply a verify pass voltage higher than the verify voltage to unselected word lines.

During a read operation, the address decoder 121 may apply a read voltage to a selected word line and apply a pass voltage higher than the read voltage to unselected word lines.

In an embodiment, an erase operation of the memory device 100 may be performed on a memory block basis. During the erase operation, an address ADDR to be inputted to the memory device 100 includes a block address. The address decoder 121 may decode the block address and select a corresponding one memory block according to the decoded block address. During the erase operation, the address decoder 121 may apply a ground voltage to word lines coupled to the selected memory block.

In an embodiment, the address decoder 121 may decode a column address among the transmitted addresses ADDR. A decoded column address DCA may be transmitted to the read/write circuit 123. In an embodiment, the address decoder 121 may include components such as a row decoder, a column decoder, and an address buffer.

The voltage generator 122 may generate a plurality of voltages using an external power voltage supplied to the memory device 100. The voltage generator 122 is operated under control of the control logic 130.

In an embodiment, the voltage generator (122) may generate an internal supply voltage by regulating an external supply voltage. The internal supply voltage generated from the voltage generator 122 may be used as an operating voltage of the memory device 100.

In an embodiment, the voltage generator 122 may produce a plurality of voltages using the external supply voltage or the internal supply voltage. The voltage generator 122 may generate various voltages required in the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal supply voltage, and generate a plurality of voltages by selectively enabling the plurality of pumping capacitors under control of the control logic 130.

The generated voltages may be supplied to the memory cell array 110 by the address decoder 121.

The read/write circuit 123 may include first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may operate under control of the control logic 130.

The first to m-th page buffers PB1 to PBm may perform data communication with the data input/output circuit 124. During a program operation, the first to m-th page buffers PB1 to PBm may receive data DATA to be stored through the data input/output circuit 124 and data lines DL.

During a program operation, the first to m-th page buffers PB1 to PBm may transmit the data DATA, received through the data input/output circuit 124, to selected memory cells through the bit lines BL1 to BLm when a program pulse is applied to a selected word line. The memory cells in the selected page are programmed based on the transmitted data DATA. Memory cells coupled to a bit line to which a program allowable voltage (e.g. a ground voltage) is applied may have increased threshold voltages. Threshold voltages of memory cells coupled to a bit line to which a program inhibit voltage (for example, a supply voltage) is applied may be retained. During a program verify operation, the first to m-th page buffers PB1 to PBm may read page data from selected memory cells through the bit lines BL1 to BLm.

During a read operation, the read/write circuit 123 may read data DATA from the memory cells in the selected page through the bit lines BL, and output the read data DATA to the data input/output circuit 124.

During an erase operation, the read/write circuit 123 may float the bit lines BL. In an embodiment, the read/write circuit 123 may include a row select circuit.

The data input/output circuit 124 is coupled to the first to m-th page buffers PB1 to PBm through the data lines DL. The data input/output circuit 124 may operate under control of the control logic 130.

The data input/output circuit 124 may include a plurality of input/output buffers (not shown) which receive input data. During a program operation, the data input/output circuit 124 may receive data DATA to be stored from an external controller (not shown). During a read operation, the data input/output circuit 124 may output, to the external controller, the data received from the first to m-th page buffers PB1 to PBm included in the read/write circuit 123.

The control logic 130 may be coupled to the address decoder 121, the voltage generator 122, the read/write circuit 123, and the data input/output circuit 124. The control logic 130 may control the overall operation of the memory device 100. The control logic 130 may operate in response to a command CMD transmitted from an external device.

Figure 8:
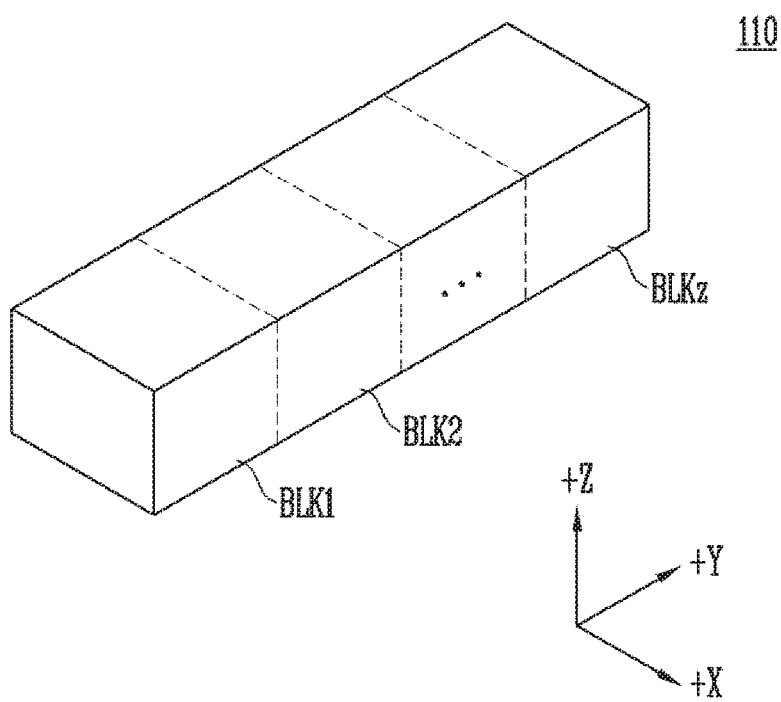
FIG. 8 is a diagram illustrating a memory cell array of FIG. 7 in accordance with an embodiment of the present disclosure.

FIG. 8 is a diagram illustrating an example of the memory cell array of FIG. 7 in accordance with an embodiment of the present disclosure.

Referring to FIG. 8, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 9 and 10.

Figure 9:
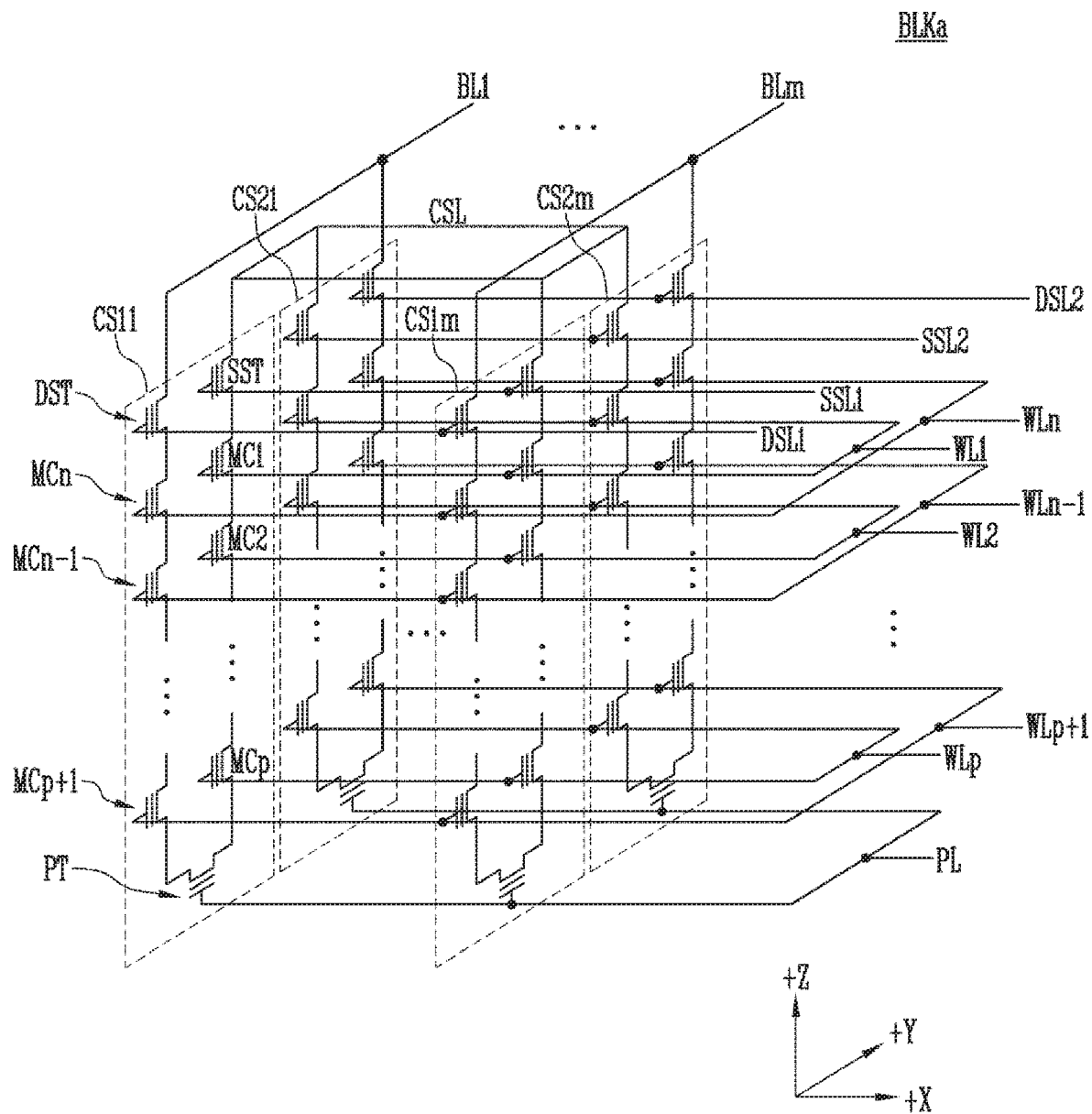
FIG. 9 is a circuit diagram illustrating any one (BLKa) of memory blocks (BLK1) to (BLKz) of FIG. 8 in accordance with an embodiment of the present disclosure.

FIG. 9 is a circuit diagram illustrating any one (BLKa) of memory blocks (BLK1) to (BLKz) of FIG. 8 in accordance with an embodiment of the present disclosure.

Referring to FIG. 9, the memory block BLKa may include a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings may be arranged in a row direction (i.e., the +X direction). In FIG. 9, two cell strings are illustrated as being arranged in a column direction (i.e., the +Y direction). However, this illustration is made for convenience of description, and it will be understood that three or more cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have structures similar to each other. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 9, source select transistors of the cell strings CS11 to CS1$m$ in a first row are coupled to a first source select line SSL1. Source select transistors of the cell strings CS21 to CS2$m$ in a second row are coupled to a second source select line SSL2.

In an embodiment, the source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to nth memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to nth memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1$m$ in the first row are coupled to a first drain select line DSL1. Drain select transistors of the cell strings CS21 to CS2$m$ in the second row are coupled to a second drain select line DSL2.

Cell strings arranged in the column direction may be coupled to bit lines extending in the column direction. In FIG. 9, cell strings CS11 and CS21 in a first column are coupled to a first bit line BL1. Cell strings CS1$m$ and CS2$m$ in an m-th column are coupled to an m-th bit line BLm.

Memory cells coupled to the same word line in cell strings arranged in the row direction form a single page. For example, memory cells coupled to the first word line WL1, among the cell strings CS11 to CS1$m$ in the first row, form a single page. Memory cells coupled to the first word line WL1, among the cell strings CS21 to CS2$m$ in the second row, form another single page. Cell strings arranged in the direction of a single row may be selected by selecting any one of the drain select lines DSL1 and DSL2. One page may be selected from among the selected cell strings by selecting any one of the word lines WL1 to WLn.

In an embodiment, even bit lines and odd bit lines may be provided in lieu of the first to m-th bit lines BL1 to BLm. Even-number-th cell strings of the cell strings CS11 to CS1$m$ or CS21 to CS2$m$ arranged in the row direction may be coupled to respective even bit lines. Odd-number-th cell strings of the cell strings CS11 to CS1$m$ or CS21 to CS2$m$ arranged in the row direction may be coupled to respective odd bit lines.

In an embodiment, at least one or more of the first to n-th memory cells MC1 to MCn may be used as a dummy memory cell. For example, the at least one or more dummy memory cells may be provided to reduce an electric field between the source select transistor SST and the memory cells MC1 to MCp. Alternatively, the at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 10:
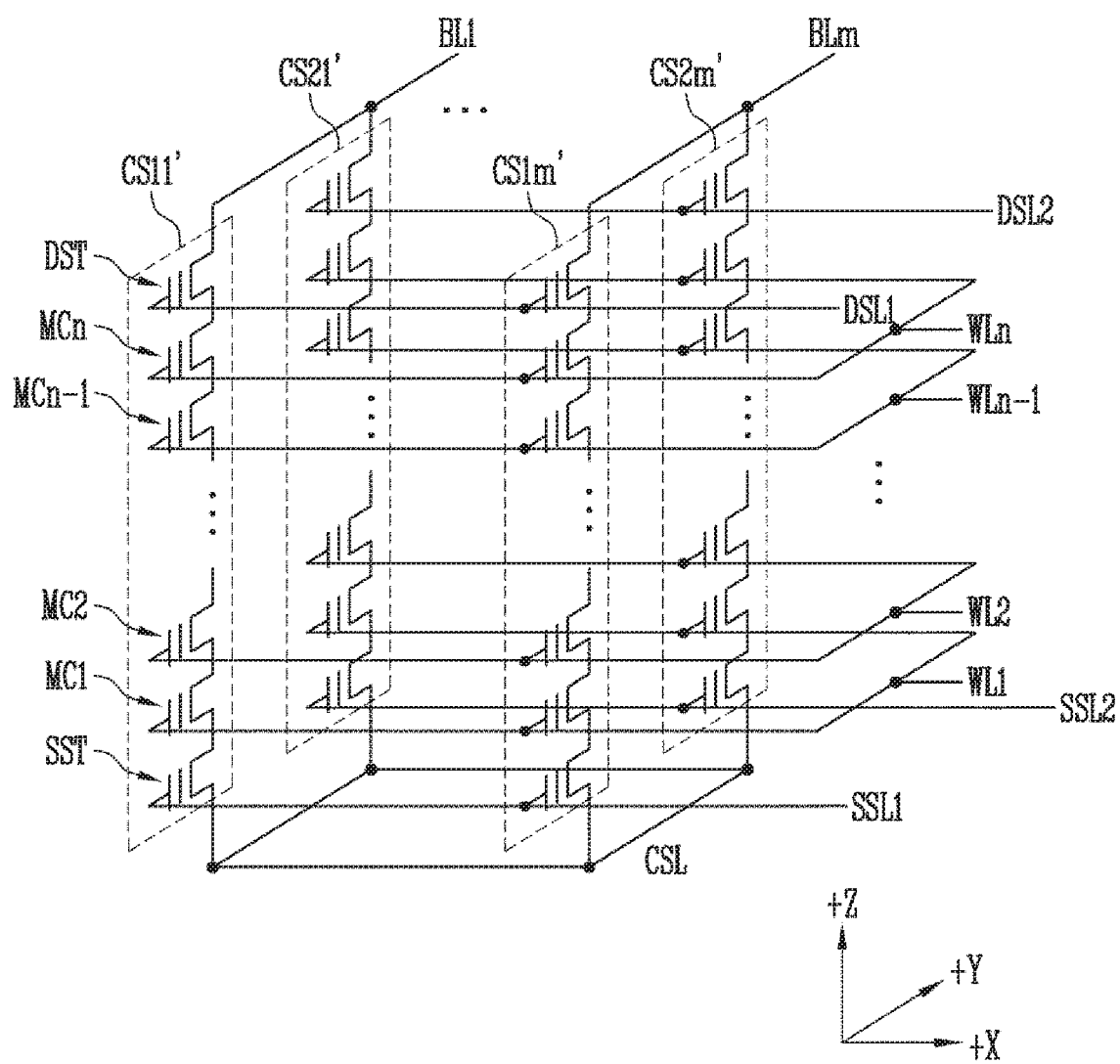
FIG. 10 is a circuit diagram illustrating any one (BLKb) of the memory blocks (BLK1) to (BLKz) of FIG. 8 in accordance with an embodiment of the present disclosure.

FIG. 10 is a circuit diagram illustrating any one BLKb of memory blocks BLK1 to BLKz of FIG. 8 in accordance with an embodiment of the present disclosure.

Referring to FIG. 10, a memory block BLKb may include a plurality of cell strings CS11' to CS1$m$' and CS21' to CS2$m$'. Each of the cell strings CS11' to CS1$m$' and CS21' to CS2$m$' extends in the +Z direction. Each of the cell strings CS11' to CS1$m$' and CS21' to CS2$m$' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1$m$' arranged in a first row may be coupled to a first source select line SSL1. Source select transistors of the cell strings CS21' to CS2$m$' arranged in a second row may be coupled to a second source select line SSL2. In an embodiment, source select transistors of the cell strings CS11' to CS1$m$' and CS21' to CS2$m$' may be coupled in common to a single source select line.

The first to nth memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block KO of FIG. 10 may have an equivalent circuit similar to that of the memory block BLKa of FIG. 9 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one or more of the first to n-th memory cells MC1 to MCn may be used as a dummy memory cell. For example, the at least one or more dummy memory cells may be provided to reduce an electric field between the source select transistor SST and the memory cells MC1 to MCn. Alternatively, the at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling a voltage to be applied to the dummy word lines coupled to the respective dummy memory cells.

Figure 11:
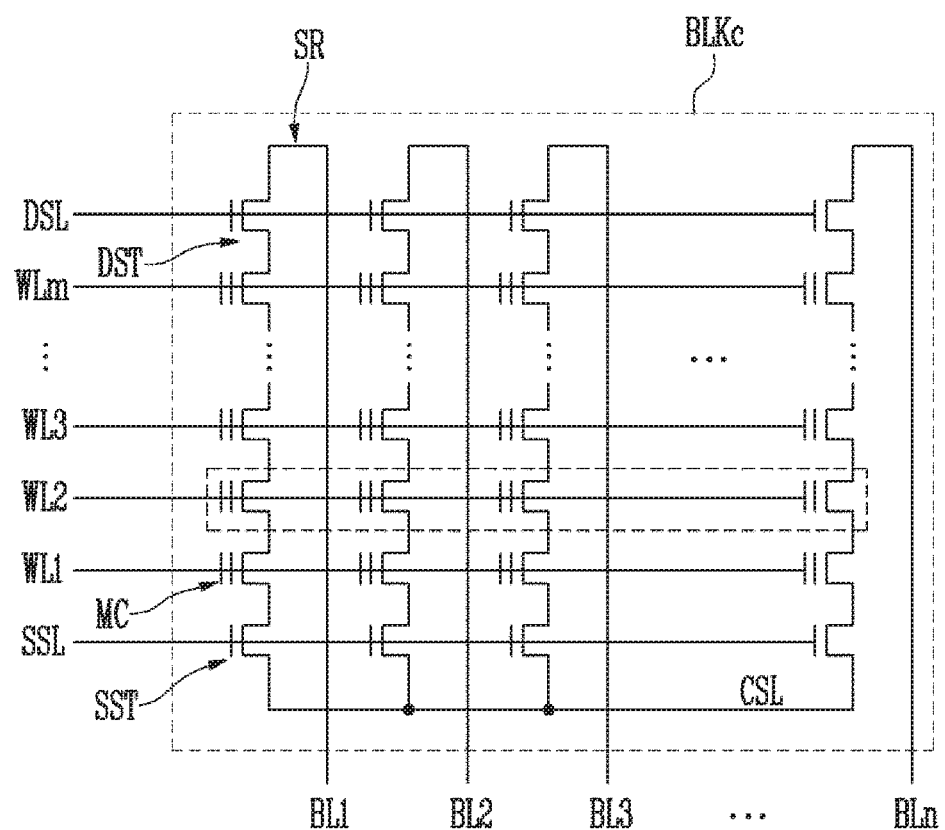
FIG. 11 is a circuit diagram illustrating any one (BLKc) of the memory blocks (BLK1) to (BLKz) included in the memory cell array of FIG. 7 in accordance with an embodiment of the present disclosure.

FIG. 11 is a circuit diagram illustrating any one BLKc of the memory blocks BLK1 to BLKz included in the memory cell array 110 of FIG. 7 in accordance with an embodiment of the present disclosure.

Referring to FIG. 11, the memory block BKLc may include a plurality of strings SR. The plurality of strings SR may be respectively coupled to a plurality of bit lines BL1 to BLn. Each string SR may include a source select transistor SST, memory cells MC, and a drain select transistor DST.

The source select transistor SST of each string SR may be coupled between the memory cells MC and a common source line CSL. The source select transistors SST of the strings SR may be coupled in common to the common source line CSL.

The drain select transistor DST of each string SR may be coupled between the memory cells MC and the corresponding bit line BL. The drain select transistors DST of the strings SR may be respectively coupled to the bit lines BL1 to BLn.

In each string SR, a plurality of memory cells MC may be provided between the source select transistor SST and the drain select transistor DST. In each string SR, the memory cells MC may be coupled in series with each other.

In the strings SR, memory cells MC disposed in the same turn from the common source line CSL may be coupled in common to a single word line. The memory cells MC of the strings SR may be coupled to a plurality of word lines WL1 to WLm.

In the memory block BLKc, an erase operation may be performed on a memory block basis. When the erase operation is performed on a memory block basis, all memory cells of the memory block BLKc may be simultaneously erased in response to an erase request.

Figure 12:
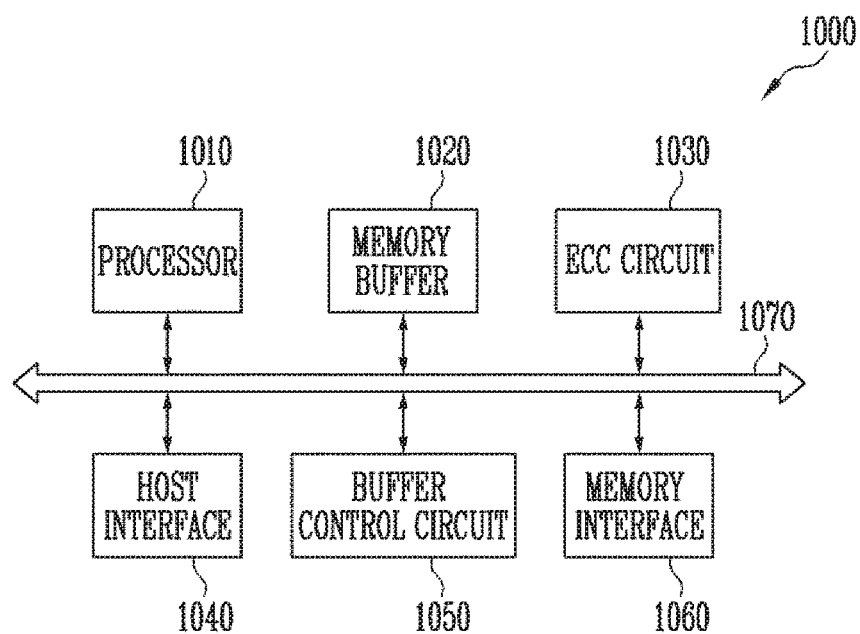
FIG. 12 is a diagram illustrating an example of the memory controller of FIG. 1 in accordance with an embodiment of the present disclosure.

FIG. 12 is a diagram illustrating an example of the memory controller 200 of FIG. 1 in accordance with an embodiment of the present disclosure.

The memory controller 1000 is coupled to the host and the memory device. In response to a request from the host, the controller 1000 may access the memory device. For example, the memory controller 1000 may control a write operation, a read operation, an erase operation, and a background operation of the memory device. The memory controller 1000 may provide an interface between the memory device and the host. The memory controller 1000 may drive firmware for controlling the memory device.

Referring to FIG. 12, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the external host through the host interface 1040, and communicate with the memory device 100 through the memory interface 1060. In addition, the processor 1010 may communicate with the memory buffer 1020 through the buffer control circuit 1050. The processor 1010 may control the operation of the storage device 50 using the memory buffer 1020 as an operation memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. An address mapping method using the FTL may be modified in various ways based on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host. Randomized data may be provided to the memory device 100 as data to be stored, and may be programmed to the memory cell array.

During a read operation, the processor 1010 may derandomize data received from the memory device 100. For example, the processor 1010 may use a derandomizing seed to derandomize data received from the memory device 100. Derandomized data may be output to the host.

In an embodiment, the processor 1010 may drive software or firmware to perform the randomizing operation or the derandomizing operation.

The memory buffer 1020 may be used as an operation memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM). In an embodiment, the host interface 1040 may be included in the host controller 202 described with reference to FIG. 2.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel. In an embodiment, the memory interface 1060 may be included in the flash memory controller 203 described with reference to FIG. 3.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 13:
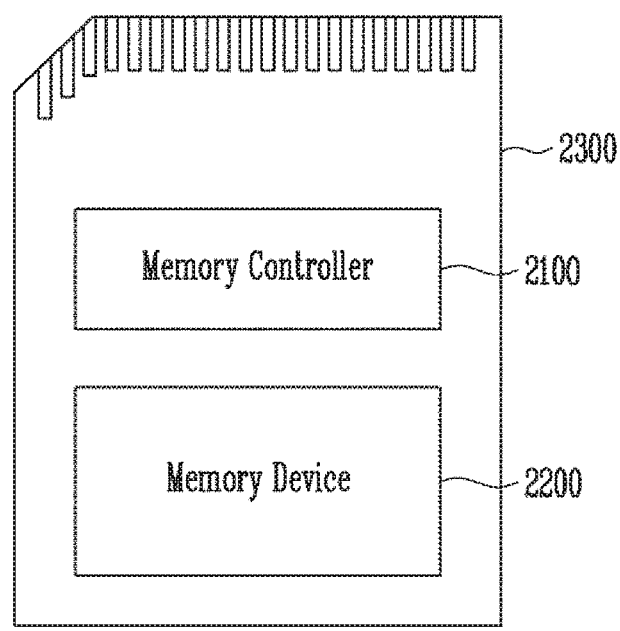
FIG. 13 is a block diagram illustrating a memory card system to which a storage device in accordance with an embodiment of the present disclosure is applied.

FIG. 13 is a block diagram illustrating a memory card system 2000 to which a storage device in accordance with an embodiment of the present disclosure is applied.

Referring FIG. 13, the memory card system 2000 may include a memory controller 2100, a memory device 2200 and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and the host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as a random access memory (RAM), a processing unit, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any one of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (SM or SMC), a memory stick, a multimedia card (MMC, RS-MMC, or MMCmicro), a SD card (SD, miniSD, microSD, or SDHC), or a universal flash storage (UFS).

Figure 14:
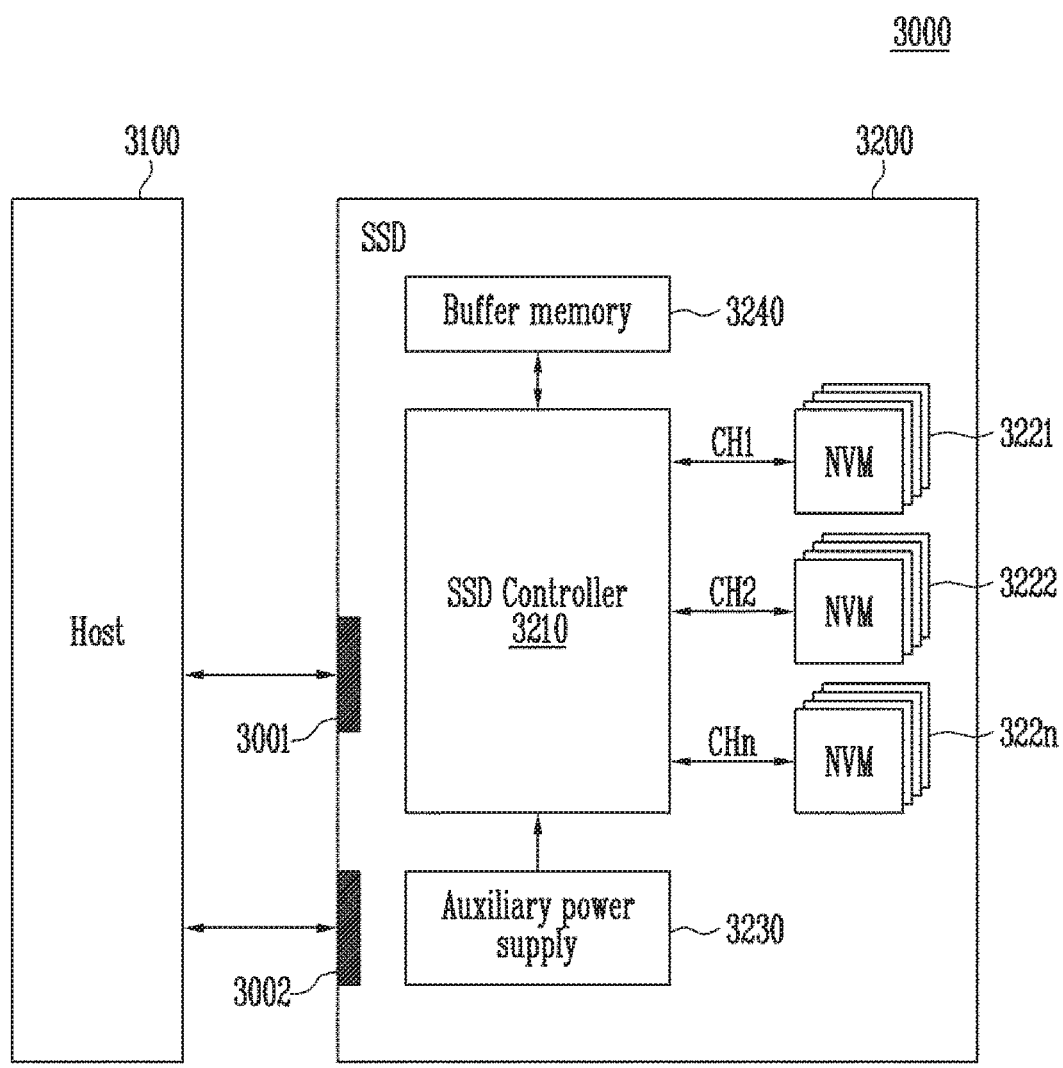
FIG. 14 is a block diagram illustrating a solid state drive (SSD) system to which the storage device in accordance with an embodiment of the present disclosure is applied.

FIG. 14 is a block diagram illustrating a solid state drive (SSD) system 3000 to which the storage device in accordance with an embodiment of the present disclosure is applied.

Referring to FIG. 14, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 15:
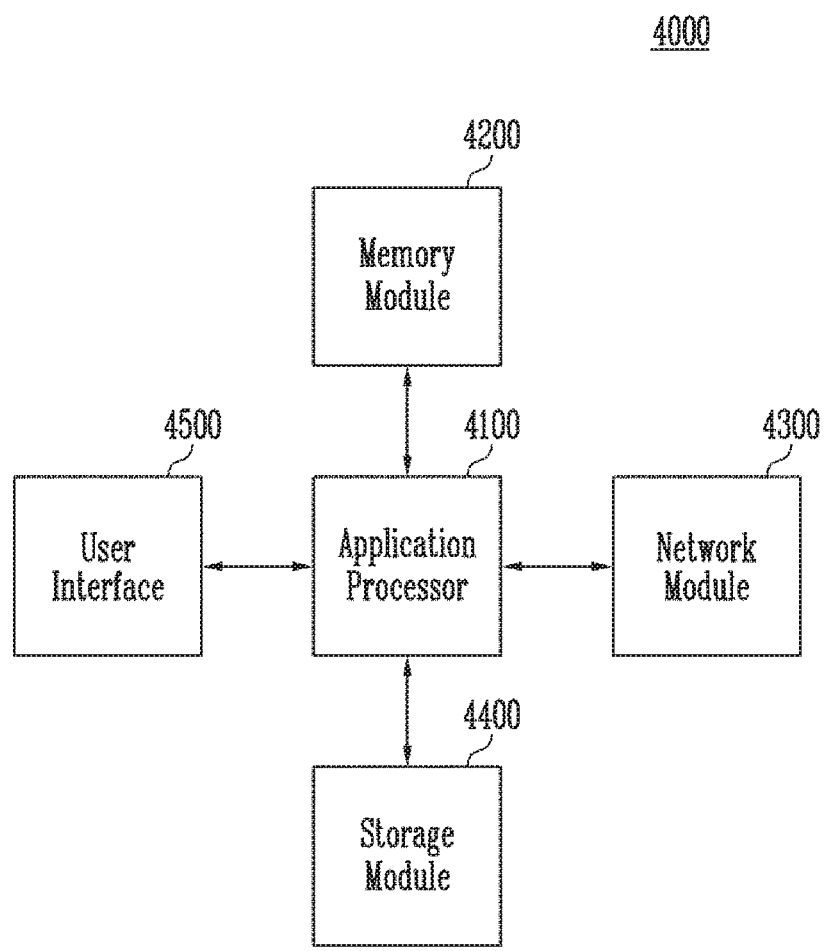
FIG. 15 is a block diagram illustrating a user system to which the storage device in accordance with an embodiment of the present disclosure is applied.

FIG. 15 is a block diagram illustrating a user system 4000 to which the storage device in accordance with an embodiment of the present disclosure is applied.

Referring to FIG. 15, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, and each of the plurality of nonvolatile memory devices may be operated in the same manner as that of the memory device 100, described above with reference to FIGS. 1 to 5. The storage module 4400 may be operated in the same manner as that of the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as an a liquid crystal display (LCD), an organic light emitting diode (OLED) display device, an active matrix OLED (AMOLED) display device, an LED, a speaker, and a motor.

Various embodiments of the present disclosure may provide a memory controller configured to suspend, so as to perform a priority read command, a command that is currently performed, and a method of operating the memory controller.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

In the above-discussed embodiments, all steps may be selectively performed or skipped. In addition, the steps in each embodiment may not always be performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller comprising:
   a host interface layer configured to receive a request for a memory device from a host;
   a flash translation layer configured to generate a descriptor including a flag indicating whether the request is a priority read request; and
   a flash interface layer configured to suspend requests input prior to the priority read request in a descriptor queue based on the flag, move the suspended requests from the descriptor queue into a suspend queue, and perform the priority read request queued in the descriptor queue before resuming the suspended requests queued in the suspend queue.

2. The memory controller according to claim 1, wherein the flash translation layer comprises a suspend operation control unit configured to generate the descriptor and resume an operation of performing the suspended requests.

3. The memory controller according to claim 2, wherein the flash interface layer comprises a flash memory controller configured to perform an operation on the memory device based on the descriptor.

4. The memory controller according to claim 3, wherein the flash memory controller comprises:
   a command management unit configured to manage a command for the memory device; and
   a memory operation control unit configured to generate the command and provide the generated command to the memory device.

5. The memory controller according to claim 4,
   wherein the command management unit comprises the descriptor queue configured to store the descriptor in an input sequence, and
   wherein, when a descriptor corresponding to the priority read request is input to the descriptor queue, the memory operation control unit suspends commands corresponding to descriptors stored prior to the descriptor corresponding to the priority read request.

6. The memory controller according to claim 5, wherein the command management unit further comprises the suspend queue configured to store the suspended commands corresponding to the descriptors stored prior to the descriptor corresponding to the priority read request.

7. The memory controller according to claim 6, wherein the suspend operation control unit comprises:
   a command scheduler configured to generate the descriptor including a flag having a set status when the request is the priority read request, and generate the descriptor including a flag having an off status when the request is not the priority read request; and
   a resume processor configured to resume the requests stored in the suspend queue depending on an operating status of the memory device.

8. The memory controller according to claim 6, wherein the memory operation control unit sets, to a suspend status, a command that is currently performed by the memory device among the commands corresponding to the descriptors stored prior to the descriptor corresponding to the priority read request, and sets, to a hold status, commands to be performed by the memory device among the commands corresponding to the descriptors stored prior to the descriptor corresponding to the priority read request.

9. The memory controller according to claim 5, wherein the memory operation control unit provides, to the memory device, a suspend command for suspending a command that is currently performed by the memory device among the commands corresponding to the descriptors stored prior to the descriptor corresponding to the priority read request.

10. The memory controller according to claim 9, wherein the memory operation control unit generates a priority read command corresponding to the priority read request after the command that is currently performed by the memory device is suspended, and provides the priority read command to the memory device.

11. The memory controller according to claim 7, wherein the resume processor determines whether the commands stored in the suspend queue are present at each predetermined cycle.

12. The memory controller according to claim 1, wherein the priority read request is a read request in which output of read data is ensured within a preset latency.

13. A memory system comprising:
   a memory device;
   a command scheduler configured to generate a priority descriptor and a normal descriptor in response to a request;
   a memory operation control unit configured to suspend an on-going operation or hold a pending operation in response to the priority descriptor queued in a first queue and
   move the normal descriptor queued prior to the priority descriptor from the first queue into a second queue; and
   a resume processor configured to control, after completion of an operation corresponding to the priority descriptor, the memory device to resume the suspended or held operation according to the normal descriptor in the second queue,
   wherein the on-going operation or the pending operation corresponds to the normal descriptor queued prior to the priority descriptor in the first queue.

14. A memory system comprising:
   a memory device;
   a command scheduler suitable for generating, in response to a request, a priority descriptor and a normal descriptor;
   a memory operation control unit suitable for:
   suspending, in response to the priority descriptor queued in a first queue, an on-going operation or holding a pending operation for the normal descriptor queued prior to the priority descriptor in the first queue; and
   moving the normal descriptor queued prior to the priority descriptor from the first queue into a second queue;
   a register configured to manage suspend-related information about a degree to which the suspended on-going operation has been performed before the suspension; and
   a resume processor suitable for controlling, after completion of an operation corresponding to the priority descriptor, the memory device to resume the suspended on-going operation from the suspend-related information rather than re-performing the suspended on-going operation from the beginning.

* * * * *